Aug. 26, 1969
L. CANADELLI
3,463,988
BI-PHASE AND SINGLE-PHASE MOTOR WITH POLARITY SWITCHING
Filed March 29, 1966 — 3 Sheets-Sheet 1
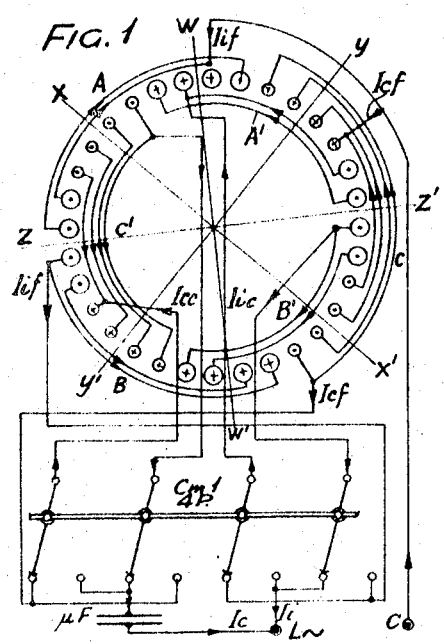
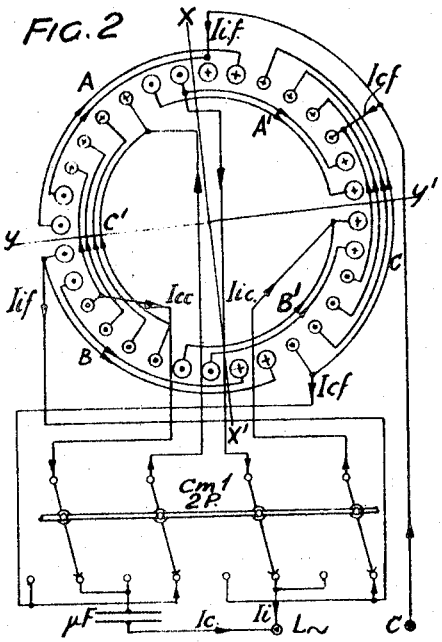
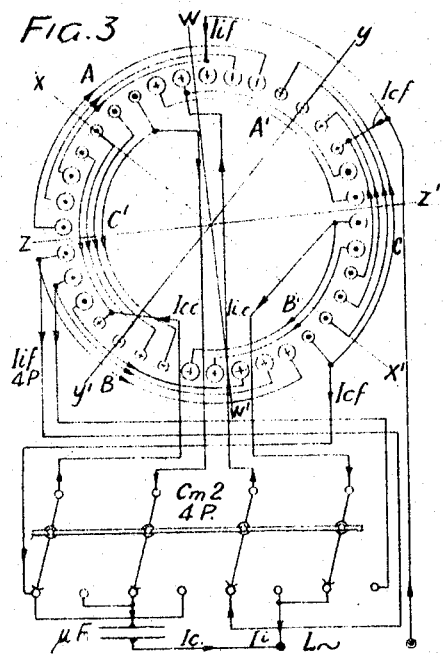
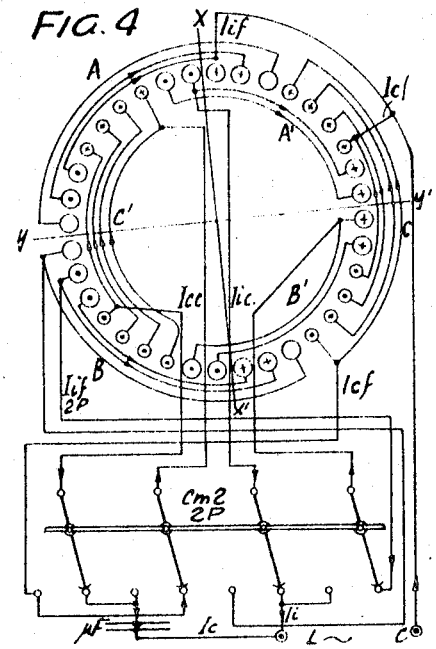
LUCIANO CANADELLI INVENTOR
ATTORNEY

United States Patent Office 3,463,988
Patented Aug. 26, 1969

3,463,988
BI-PHASE AND SINGLE-PHASE MOTOR WITH POLARITY SWITCHING
Luciano Canadelli, Via Varesina 71/B,
Como, Italy
Filed Mar. 29, 1966, Ser. No. 538,366
Int. Cl. H02p 1/38, 1/42, 3/18
U.S. Cl. 318—224                4 Claims

---

ABSTRACT OF THE DISCLOSURE

A two-speed single phase motor having a stator provided with two similar groups of windings, each consisting of two series-connected inductive windings and a capacitive winding having a considerably greater number of coils than and spanning a much larger number of slots than each inductive winding, the two groups of windings being symmetrically located, with the inductive windings of one group diametrically opposite the inductive windings of the other group and the capacitive windings diametrically opposite each other. The windings are interconnected in a network including two parallel branches, one branch consisting of the two pairs of series-connected inductive windings and the other branch consisting of the capacitive windings connected in series with a capacitor. A 4-pole, double-throw switch is connected in the network to simultaneously reverse the connections of the series-connected inductive windings of one group and the connections of the capacitive winding of said one group. In a first position of the switch, the network connections provide a 4-pole stator configuration, with corresponding motor speed. In the second position of the switch, due to the reversal of the winding connections, a two-pole stator configuration is provided, with resultant doubled motor speed.

---

Unlike three-phase motors wherein due to star triangle connection symmetry both two pole pitch and four pole pitch interwinding by a single winding was made possible, a connection capable of operating a motor by switching the number of poles has never been possible, heretofore, in a bi-phase system.

Although energy distribution in a bi-phase line, that is a four-wire line, is at present very little used, owing to wide usage of electrical appliances a great importance has been assumed by single-phase, two-winding motors, i.e. motors provided with phasing capacity, just operating with two currents having a phase displacement of about 90°.

It is an object of the present invention to provide a bi-phase and single-phase motor characterized by having a single layer winding for two-speed performance.

The accompanying drawing diagrammatically shows, by way of not limitative example, two embodiments of the present invention, and namely:

FIGURES 1 and 2 show the diagram of an embodiment for a motor according to the present invention, switched in the four pole position and two pole position, respectively;

FIGURES 3 and 4 show the diagram of another embodiment for a motor according to the present invention, switched in the four pole position and two pole position, respectively.

Figure 5:
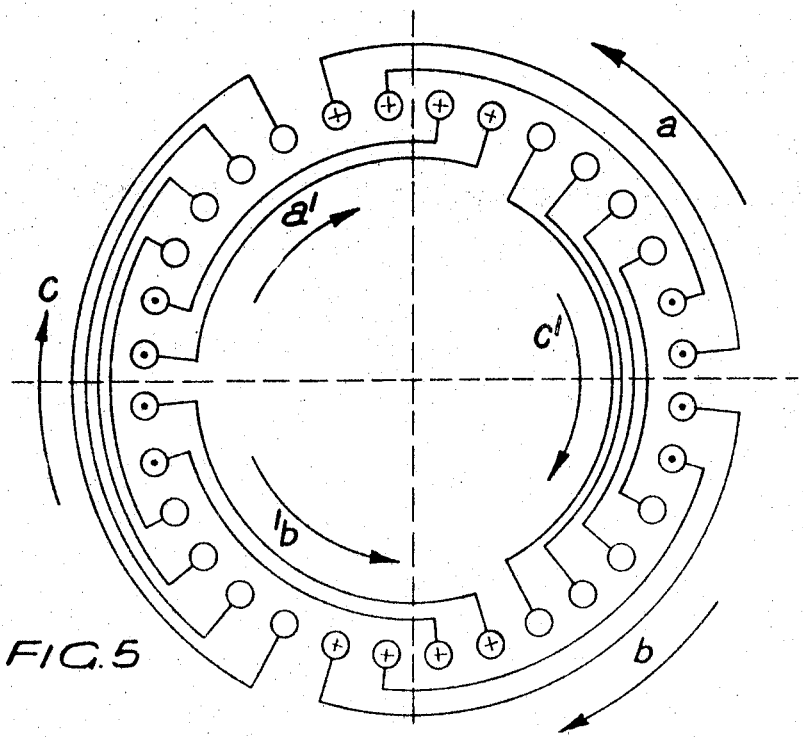
FIGURES 5 and 6 show the diagram of a further embodiment for a motor according to the present invention, switched in the four pole position and two pole position, respectively.

In order to attain a polarity switching with a single winding in a bi-phase system, a very particular winding apt to maintain the flux axes of the two phases constantly at 90 electrical degrees both for one polarity and for the other polarity has been devised, said winding being herein described with the aid of the appended figures.

Similarly to three-phase motors, switching takes place from any polarity to halved polarity: 4/2 poles, 8/4 poles, 12/6 poles, 16/8 poles, by inverting the direction of the currents in the second section of a two-part winding, said second section being symmetric with the first section in which direction of currents is unchanged.

Obviously, two-pole motors are of no interest for the new system. Consideration starts from a four pole motor; the winding of the first section is carried out at the air-gap periphery with coils being arranged in a three-segment system in lieu of a 90° distribution according to the conventional system.

Two coils A and B are connected in series and represent half of the inductive winding (single-phase motor with capacitive phase), in which the current direction remains unchanged; the third coil C represents half of the capacitive winding, in which the current direction also remains unchanged.

The second section composed of coils A' B' C', representing the second half of both inductive and capacitive winding, and carried out by a process symmetrically opposite the first section forms the two half phases switchable by means of the four-pole switch $Cm1$.

FIGURE 1 shows a stator having 32 coil slots: large circles show the coil slots occupied by conductors of the inductive phase $Ii$; small circles show the coil slots occupied by the capacitive phase $Ic$; small crosses show inlet direction of the currents into the coil slots; dots show the outlet direction.

Of course, for a 50 c.p.s. alternating current such conventional marks refer to a period of $1/100$ of a second; the inductive phase coils are indicated by thick lines, whereas the capacitive phase coils are indicated by thin lines; letter $c$ indicates the common wire: $Iif$ indicates the starting and end of the fixed inductive phase: $Icf$ indicates the starting and end of the fixed capacitive phase: $Iic$ indicates the starting and end of the switchable inductive phase; $Icc$ indicates the starting and end of the switchable capacitive phase.

Switch $Cm1$ is on the four pole position; as a matter of fact, on following the direction of the arrows the stator has four polarities for the inductive phase according to the magnetic axes $x-x'$ and $y-y'$, four polarities for the capacitive phase according to the magnetic axes $z-z'$ and $w-w'$ at 90 electrical degrees with the former; L is the feeding single-phase line.

Because of the symmetry of the series-connected inductive windings A–B' and A'–B, the respective magnetic polar axes $x-x'$ and $y-y'$, perpendicular to each other, are defined. Each of these windings spans 10 slots and each comprises two coils.

Because of the symmetry of the series-connected capacitive windings C–C', the respective magnetic polar axes $z-z'$ and $w-w'$, perpendicular to each other and 90° electrically (45° mechanically in FIGURE 1) spaced from axes $x-x'$ and $y-y'$. The windings C–C' each comprises 4 coils, the inner 2 coils of the windings C–C' defining the polar axis $z-z'$; the outer 2 coils of the respective windings C–C' cooperate with each other to define the polar axis $w-w'$, perpendicular to the polar axis $z-z'$.

FIGURE 2 shows switching for two poles; as a matter of fact, whilst direction of the currents for the first (outer) section remains unchanged, those for the second (inner) section are inverted forming two magnetic axes: $x-x'$ for the inductive phase, and $y-y'$ for the capacitive phase, said axes always being at 90 electrical degrees to each other.

In order to equalize magnetic density in the airgap, a differentiated fixed inductive winding is used as shown in FIGURES 3 and 4.

Stator has 36 coil slots, of which 20 are occupied by the inductive phase, and 16 are occupied by the capacitive phase only during the four pole position, whilst for the two pole position the winding becomes symmetric as in the case of FIGURE 2.

Switch $Cm2$, constructively the same as $Cm1$, allows such a switching; the terminal of six inductive coils fixed on the four pole position (asymmetric inductive winding) terminates at the connectors for a fixed inductive phase, whereas the terminal of four coils of the same phase (symmetric inductive winding) terminates on the two pole position; both in the four pole and in the two pole case, position of the magnetic axes is unchanged.

It is apparent that, even employing a fractional number of pole/phase coil slots and always respecting both for the first fixed section and for the second switchable section three-part winding distribution in the stator coil slots, the magnetic axes will always be at 90 electrical degrees.

FIGURE 5 shows a two-section winding having four pole/phase coil slots (small circles show stator coil slots); the outer section comprises three sets of coils $a$–$b$–$c$ wherein direction of the currents is indicated by the respective arrows: such a winding is fixed and represents half of the total winding: the other half is represented by coils $a'$–$b'$–$c'$, said coils, in accordance with direction of the arrows and in combination with the first section, forming the four poles of the motor.

Figure 6:
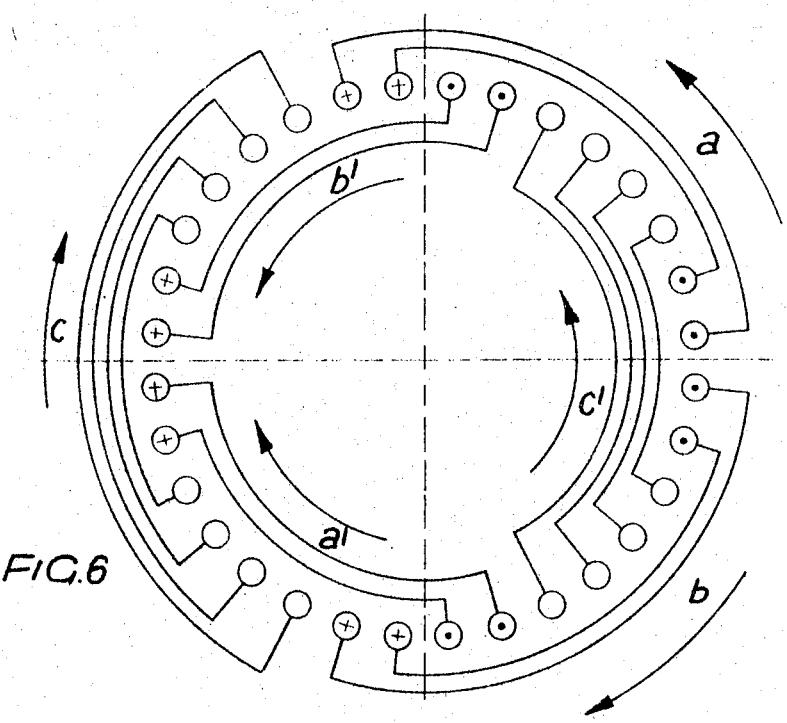
Figure 7:
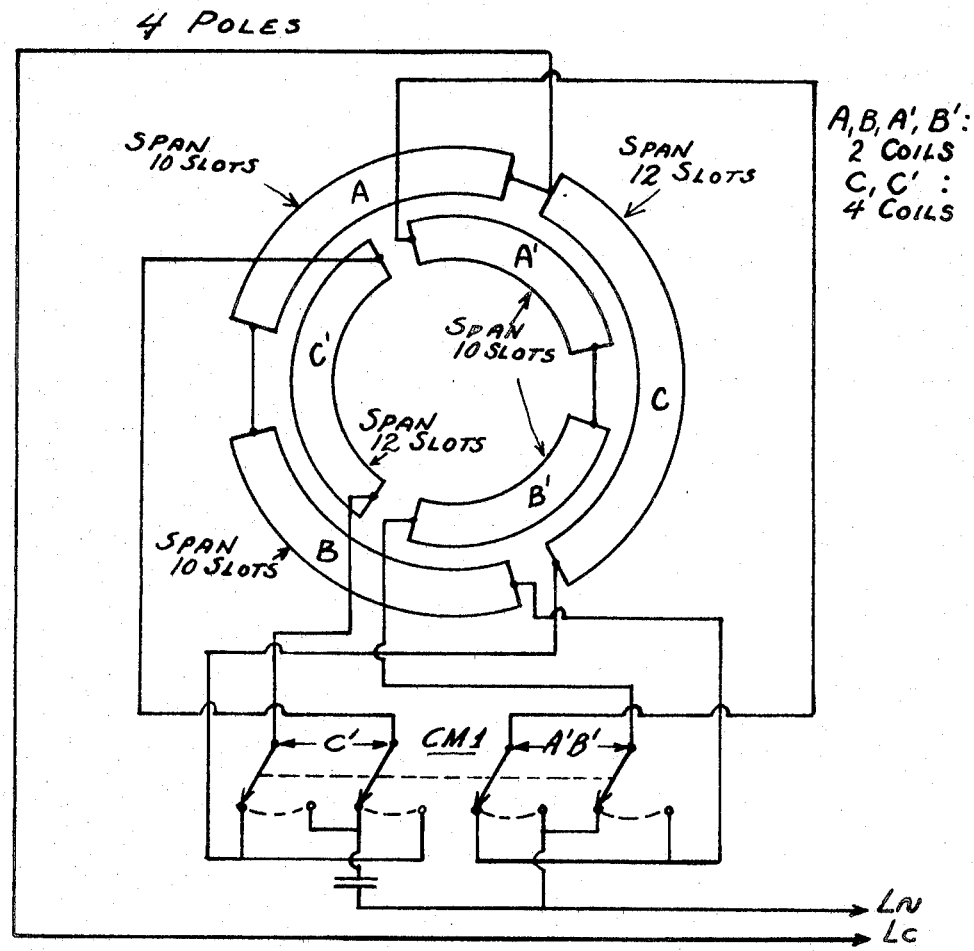
FIGURES 7, 8 and 9 are diagrams illustrating the electrical connections of the motor stator of FIGURES 1 and 2.
Figure 8:
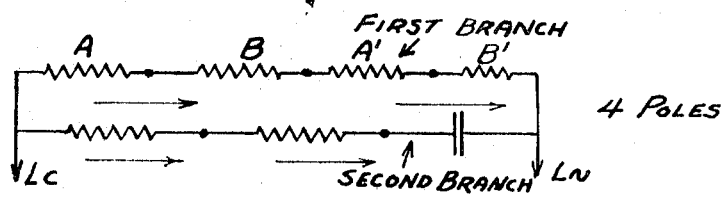
Figure 9:
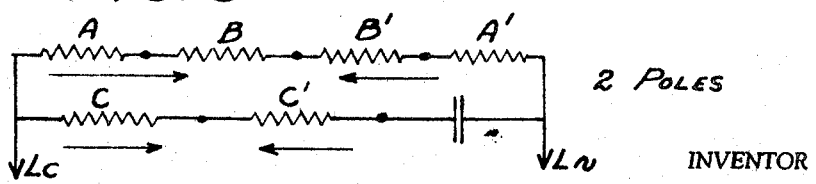

The two phases are indicated by the different thickness of the markings. By inverting through a suitable switch the direction of the currents of the inner winding section, it can clearly be seen from FIGURE 6 that the motor turns into a two-pole motor. For the sake of a greater clarity, coils relating to the main phase have been marked in the drawing with a thick marking.

What is claimed is:

1. In a two-speed single phase motor, the combination of a stator having uniformly spaced peripheral slots, two groups of windings having coils disposed in said slots, each group comprising two series-connected inductive windings and a capacitive winding having a greater number of coils than each of the inductive windings, each group comprising a three-part sequence around the stator, with the capacitive winding thereof spanning substantially more slots than either inductive winding thereof, the two groups of windings being symmetrically located so that each inductive winding of one group is diametrically opposite an inductive winding of the other group and so that the capacitive windings are diametrically opposite each other, a pair of single-phase conductors, circuit means connecting the series-connected inductive windings of one group in series with the series-connected inductive windings of the second group to form a first branch, a capacitor, circuit means connecting the capacitive windings of the two groups in series with the capacitor to form a second branch, circuit means connecting said two branches in parallel to said line conductors, whereby to define a stator configuration having a first number of magnetic poles, and means to simultaneously reverse the connections of the series-connected inductive windings of the second group and the capacitive winding of the second group, whereby to define a stator configuration having one-half said first number of magnetic poles.

2. The two-speed single phase motor combination of claim 1, and wherein the stator has at least 32 slots, the inductive windings each span at least 10 slots and have at least two coils, and the capacitive windings span at least 12 slots and have at least four coils.

3. The two-speed single phase motor combination of claim 1, and wherein the reversing means comprises a two-position, four-pole switch defining two simultaneously-operated two-pole reversing sections, circuit means connecting one reversing section between the end terminals of the series-connected inductive windings of the second group and the first branch, and circuit means connecting the other reversing section between the end terminals of the capacitive winding of the second group and said second branch.

4. The two-speed single phase motor combination of claim 3, and wherein the poles of one reversing section of the switch are connected to the end terminals of the series-connected inductive windings of the second group, and the poles of the other reversing section of the switch are connected to the end terminals of the capacitive winding of said second group.

References Cited
UNITED STATES PATENTS

| | | | |
|---|---|---|---|
| 2,813,239 | 11/1957 | LaCour | 318—225 XR |
| 2,817,050 | 12/1957 | LaCour | 318—225 XR |
| 2,896,144 | 7/1959 | Mollenberg | 318—224 |
| 3,111,616 | 12/1963 | Cantonwine | 318—224 |
| 3,263,144 | 7/1966 | Neyhouse et al. | 318—224 |

ORIS L. RADER, Primary Examiner

G. Z. RUBINSON, Assistant Examiner

U.S. Cl. X.R.

318—225